United States Patent
Angelis et al.

(10) Patent No.: US 7,355,146 B2
(45) Date of Patent: Apr. 8, 2008

(54) HEATING UNIT

(75) Inventors: Walter Georg Angelis, St. Georgen (DE); Wolfgang Arno Winkler, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 11/460,659

(22) Filed: Jul. 28, 2006

(65) Prior Publication Data

US 2007/0023411 A1 Feb. 1, 2007

(30) Foreign Application Priority Data

Jul. 28, 2005 (DE) .................. 20 2005 012 259 U (51) Int. Cl.
*B60L 1/02* (2006.01)

(52) U.S. Cl. .................. 219/202; 392/360; 165/42

(58) Field of Classification Search ............... 219/202, 219/497, 208; 392/360; 165/42
See application file for complete search history.

(56) References Cited

U.S. PATENT DOCUMENTS

| | | | |
|---|---|---|---|
| 4,356,965 A * | 11/1982 | Matsushima et al. .. | 237/12.3 B |
| 4,459,466 A * | 7/1984 | Nakagawa et al. ......... | 392/307 |
| 4,562,957 A | 1/1986 | Nakagawa et al. .... | 237/12.3 R |
| 4,963,716 A * | 10/1990 | Van Den Elst et al. ..... | 219/202 |
| 5,187,349 A * | 2/1993 | Curhan et al. ............... | 219/202 |
| 5,206,476 A * | 4/1993 | Fresch et al. ............... | 219/202 |
| 5,279,459 A * | 1/1994 | Single, II .................... | 237/2 A |

(Continued)

FOREIGN PATENT DOCUMENTS

DE 1929113 12/1965

(Continued)

OTHER PUBLICATIONS

Eichenauer, Inc. "Heating Elements," "PTC Heating Elements," retrieved on Jul. 27, 2006 from website WWW.ADVANCED HEATERS.COM/PTC, Newport, New Hampshire, 5 pages.

(Continued)

*Primary Examiner*—Tu Ba Hoang
*Assistant Examiner*—Vinod Patel
(74) *Attorney, Agent, or Firm*—Milton Oliver, Esq.; Ware Fressola Van Der Sluys & Adolphson LLP (57) ABSTRACT

A heating unit for a vehicle features a radial fan (100) having a housing (110), which housing has an air inlet (116) and an air exit opening (118). The heating unit has an air-directing device (140) that guides an air flow in a pressure chamber (115) of the housing (110) to the exit opening (118). Arranged in the housing (110) is a radial fan wheel (130) that serves to generate a flow from the air inlet (116) via the pressure chamber (115) to the air exit opening (118). Also provided is an electrical heating element, e.g. a PTC (Positive Temperature Coefficient) heating element (125), that serves to transfer heat to the air flow generated by the fan. Air-directing elements (632, 634, 636, 638) are provided between the exit opening (118) and the heating element (125), in order to generate an air flow having a more uniform (680) velocity distribution.

19 Claims, 9 Drawing Sheets

U.S. PATENT DOCUMENTS

| | | | |
|---|---|---|---|
| 5,944,481 A | 8/1999 | Stone et al. | 415/53.1 |
| 6,002,105 A * | 12/1999 | Tamada | 219/202 |
| 6,017,191 A | 1/2000 | Harmsen | 416/247 R |
| 6,050,773 A | 4/2000 | Bushnell | 415/53.1 |
| 6,079,485 A * | 6/2000 | Esaki et al. | 219/202 |
| 6,086,324 A | 7/2000 | Ikeda et al. | 415/53.1 |
| 6,897,416 B2 * | 5/2005 | Bohlender et al. | 219/494 |
| 2003/0183619 A1 * | 10/2003 | Bohlender et al. | 219/202 |
| 2004/0169027 A1 * | 9/2004 | Bohlender et al. | 219/202 |
| 2005/0051540 A1 * | 3/2005 | Ekinge et al. | 219/681 |

FOREIGN PATENT DOCUMENTS

| | | |
|---|---|---|
| DE | 1944205 | 8/1966 |
| DE | 24 48 362 C2 | 4/1976 |
| DE | 29 36 666 A1 | 4/1981 |
| DE | 85 05 560 3 | 4/1985 |
| DE | 89 03 231 4 | 7/1989 |
| DE | 39 05 091 A1 | 8/1990 |
| DE | 40 23 263 A1 | 2/1991 |
| DE | 690 14 765 T2 | 2/1991 |
| DE | 197 53 373 A1 | 6/1998 |
| DE | 698 10 705 T2 | 12/1998 |
| DE | 698 20 971 T2 | 5/1999 |
| DE | 698 20 976 T2 | 7/1999 |
| DE | 198 60 515 A1 | 6/2000 |
| DE | 100 17 808 A1 | 6/2001 |
| DE | 100 61 661 A1 | 6/2002 |
| DE | 100 63 306 A1 | 7/2002 |
| DE | 101 44 757 A1 | 3/2003 |
| DE | 203 01 910 U1 | 4/2003 |
| DE | 20 2004 018 218 U1 | 1/2005 |
| EP | 0 193 956 A3 | 9/1986 |
| GB | 1 522 316 | 8/1978 |

OTHER PUBLICATIONS

RAUSCHERT GmbH, Hermsdorf, Germany D-07629, "PTC Ceramic," retrieved on Jul. 27, 2006 from website WWW.RAUSCHERT.COM/TK/COM/WERKSTOFFE/PTC.HTM. 2 pages.

* cited by examiner

HEATING UNIT

CROSS-REFERENCE

This application claims priority from German application DE 20 2005 012 259.9 filed 28 Jul. 2005, the entire contents of which is hereby incorporated by reference.

FIELD OF THE INVENTION

The invention relates to a heating unit, particularly adapted for use in vehicles.

BACKGROUND

Vehicles of more recent design have drive units whose efficiency is very much improved as compared with earlier engines. This means that less waste heat is available to heat such vehicles; in other words, if additional actions are not taken, their occupants freeze when the weather is cold. This is particularly the case for diesel vehicles, but also for vehicles having fuel cell drive systems, for light aircraft, and for gasoline-powered vehicles with a hybrid drive system.

Additional heating units, which are operated in some cases with fuel, and in other cases with electricity, are therefore used. For example, by means of a small electric heating unit, heated air can be blown into the driver's seat and likewise into the rear footwell in order to effect heating there. By means of such heating units, warm air can be produced at the diesel filter so that the heat prevents paraffin from precipitating there.

In order to enhance traffic safety and occupant comfort, however, heating units of this kind should be generally available in order to heat not only the driver's seat, the rear footwell, and the diesel filter, but the entire passenger compartment, the steering wheel, windshield, etc. A resulting essential requirement for such heating units is therefore that they must work effectively already in the first few minutes after the vehicle is started, so that the temperature rises quickly.

SUMMARY OF THE INVENTION

It is therefore an object of the invention to provide a novel heating unit having improved uniformity of airflow through its heating element. This object is achieved by a heating unit equipped with a radial fan, a curved housing surrounding the fan and defining a pressure chamber, a heating element arranged near the air outlet, and airflow-guiding elements arranged between the pressure chamber and the heating element. A heating unit of this kind can be physically very compact, the use of a radial fan enabling a very flat design. The use of a radial fan with a high air output allows a rapid rise in temperature to be achieved, for example in a passenger compartment.

The heating unit is advantageously implemented using a miniature or subminiature fan. Miniature fans (or mini-fans) of this kind have very small dimensions. They have historically been used chiefly in electronics for active cooling of CPU chips and the like, and combine a very compact design with low cost, sufficient service life, and high efficiency.

A preferred refinement of the invention is to place more effective obstacles in that sector, of the airflow leaving the pressure chamber, which would, in the absence of obstacles, have the higher airflow velocity. What is obtained thereby is a heating unit in which the velocity of the air that flows through the heating element differs only slightly at the various locations of that heating element. This is very advantageous especially when PTC (Positive Temperature Coefficient) heating elements are used, since if the flow velocity is particularly high at one location, the electrical resistance there decreases; and if the flow velocity is low, this results in local overheating, and thus in a corresponding increase in the electrical resistance, so that little heat is generated there. With the invention, it is possible to keep the resistance of a PTC heating element of this kind largely within an optimal working range and, in this manner, to generate sufficient heat, even with a small fan. The air flow generated by the radial fan is influenced by air-directing elements in such a way that the differing flow velocities of the air flowing out of the radial fan are made substantially uniform.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION OF PREFERRED EMBODIMENTS

In the description that follows, the terms "left,", "right," "upper," and "lower" refer to the respective figure of the drawings, and can vary from one figure to the next as a function of a particular selected orientation (portrait or landscape format). Identical or identically functioning parts are labeled in the various Figures with the same reference characters, and are usually described only once.

Figure 1:
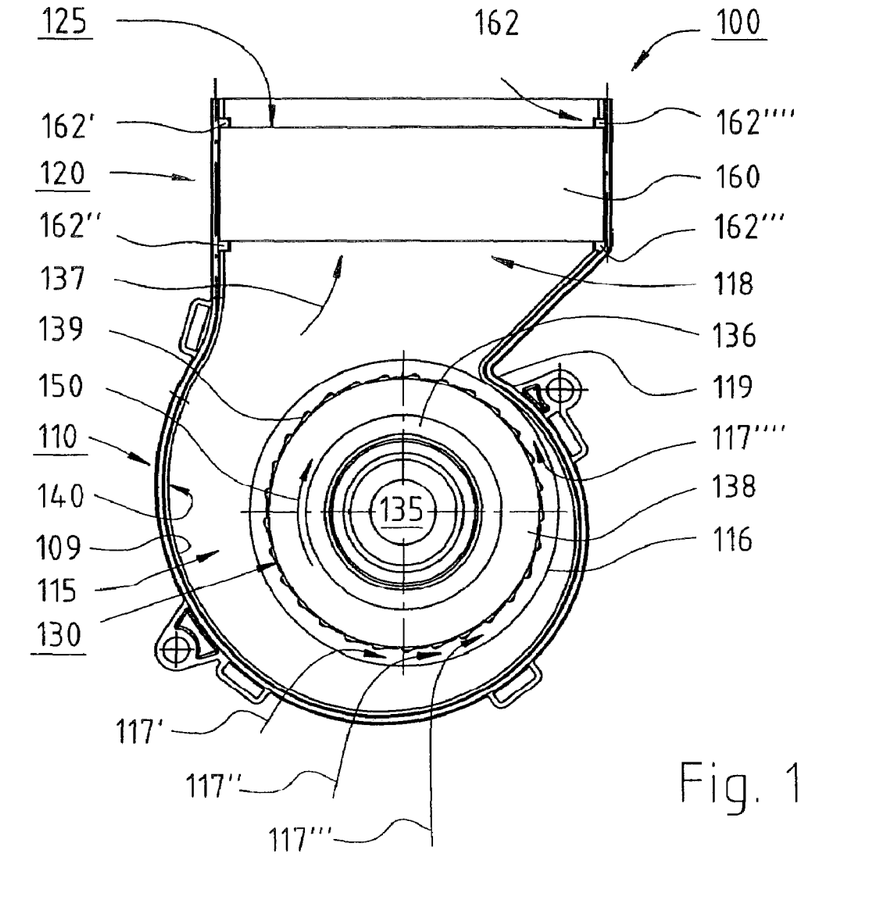
FIG. 1 is a sectioned view of a heating unit according to the present invention having a first embodiment of a heating element according to the invention.

FIG. 1 is a longitudinal section through a heating unit 100 (shown without its upper cover), viewed from a front side, according to a preferred embodiment of the invention. Heating unit 100 has a fan housing 110 and a connecting part 120. Implemented in the interior of fan housing 110 is a pressure chamber 115 in which a radial fan wheel 130 is arranged. Fan housing 110 and connecting part 120, which latter comprises an electrical heating element 125, are connected to one another. The housing has a spiral-shaped outer wall 109 and is therefore referred to as a spiral housing 110.

As FIG. 1 shows, connecting part 120 is preferably implemented integrally with fan housing 110. As an alternative thereto, however, fan housing 110 and connecting part 120 can be implemented as separate components that are connectable to one another, with the result that heating unit 100 acquires a modular construction so that heating elements of differing outputs can be coupled to fan housing 110 depending on requirements. For an application in Arctic regions, for example, the output of the heating elements used will be higher than for use in a tropical country. A modular construction also facilitates cleaning and the replacement of defective parts.

Pressure chamber 115 of fan housing 110 has an air inlet 116 that forms an intake zone through which ambient air is drawn into pressure chamber 115, as indicated by arrows 117', 117", 117''', and 117''''. Air inlet 116 is constituted by an opening in the front side of fan housing 110. In pressure chamber 115, the drawn-in air is compressed by radial fan 130 and discharged through an air exit opening 118 (FIG. 2) that constitutes an exhaust zone. In FIG. 1, air outlet 118 is located adjacent an upper rim of fan housing 110.

As FIG. 1 shows, pressure chamber 115 is spiral-shaped in order to improve the specific air output of radial fan 130, and comprises an air-directing device 140. The latter serves to guide an air flow in pressure chamber 115 toward air outlet 118, and extends in the interior of fan housing 110 from a compression starting point 119 clockwise around radial fan 130 to air outlet 118. In order to diminish noise and improve the air output of radial fan 130, air-directing device 140 can contain various elements (not shown) such as, for example, a tongue edge or a runoff ridge.

Radial fan 130 preferably constitutes a miniature fan and serves to generate an air flow from air inlet 116 through pressure chamber 115 to air outlet 118. Examples of radial fans that can be used in heating unit 100 according to the present invention are fans of the EBM-PAPST RV40, RL48, and RL65 series. The dimensions of fans of the RV40 series are 105×59×79 mm, those of the RL48 series, 76×76×27 mm, and those of fans of the RL65 series, 97×93.5×33 mm. The power consumption of such fans is 2.3-4.5 W for the RV40 series, 2.9-5 W for the RL48 series, and 15 W for the RL65 series. The weight is, for example, 75 g for the RV40 and RL48 series, and 170 g for the RL65 series.

As shown in FIG. 1, radial fan 130 has a motor 135 having an internal stator (not shown) around which rotates, during operation, an external rotor 136 on whose periphery is mounted a fan wheel 138 having fan blades 139 as indicated.

During operation, fan wheel 138 rotates clockwise, as indicated by an arrow 150, in order to generate an air flow in the direction of an arrow 137 from pressure chamber 115 to air exit opening 118. This air flow is guided by electrical heating element 125 and heated thereby.

As is evident from FIG. 1, electrical heating element 125 has a carrier 162 for an electrical resistance heating element 160, for example PTC (Positive Temperature Coefficient) resistors and/or a heating wire. Carrier 162 has four peg-shaped carrier elements 162', 162", 162''', and 162'''' that serve to mount heating element 160 in connecting part 120.

Heating element 160 depicted in FIG. 1 is preferably honeycomb-shaped, for example as a PTC honeycomb heating ceramic, and will be described below with reference to FIG. 2.

Figure 2:
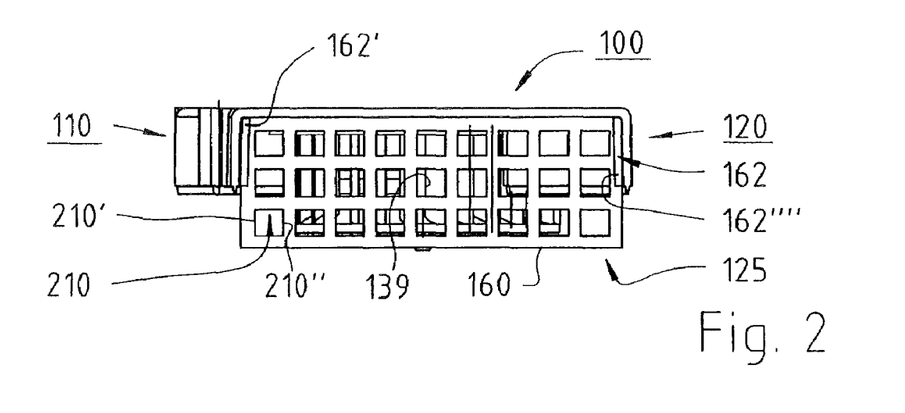
FIG. 2 is a plan view of one side of the heating unit of FIG. 1, to illustrate the first embodiment of the heating element.

FIG. 2 is a plan view of the side of heating unit 100 depicted at the top in FIG. 1, with fan housing 110 and the honeycomb-shaped heating element 160 arranged in connecting part 120. As FIG. 2 shows, heating element 160 is held in connecting part 120 by carrier 162, although only carrier elements 162' and 162''' are visible in FIG. 2

Heating element 160 has a plurality of air chambers 210 through which the air flow generated by radial fan 130 flows during operation. In that context, the heat generated by heating element 160 is transferred to the air flow.

Air chambers 210 have left inner delimiting surfaces 210' and right inner delimiting surfaces 210" that respectively define a longitudinal axis for a corresponding air chamber. In the exemplifying embodiment depicted in FIG. 2, the longitudinal axes of air chambers 210 are oriented parallel to the inner side of connecting part 120. This is illustrated by the fact that fan blades 139 are visible through air chambers 210.

The longitudinal axes can preferably be at least in part adapted to the vectorial direction of the air flow. The air flow can thus pass substantially without impediment through the honeycomb-shaped heating element 160, with the result that backflow of the air flow, and in particular a return flow of previously heated air into pressure chamber 115, are reduced.

Figure 3:
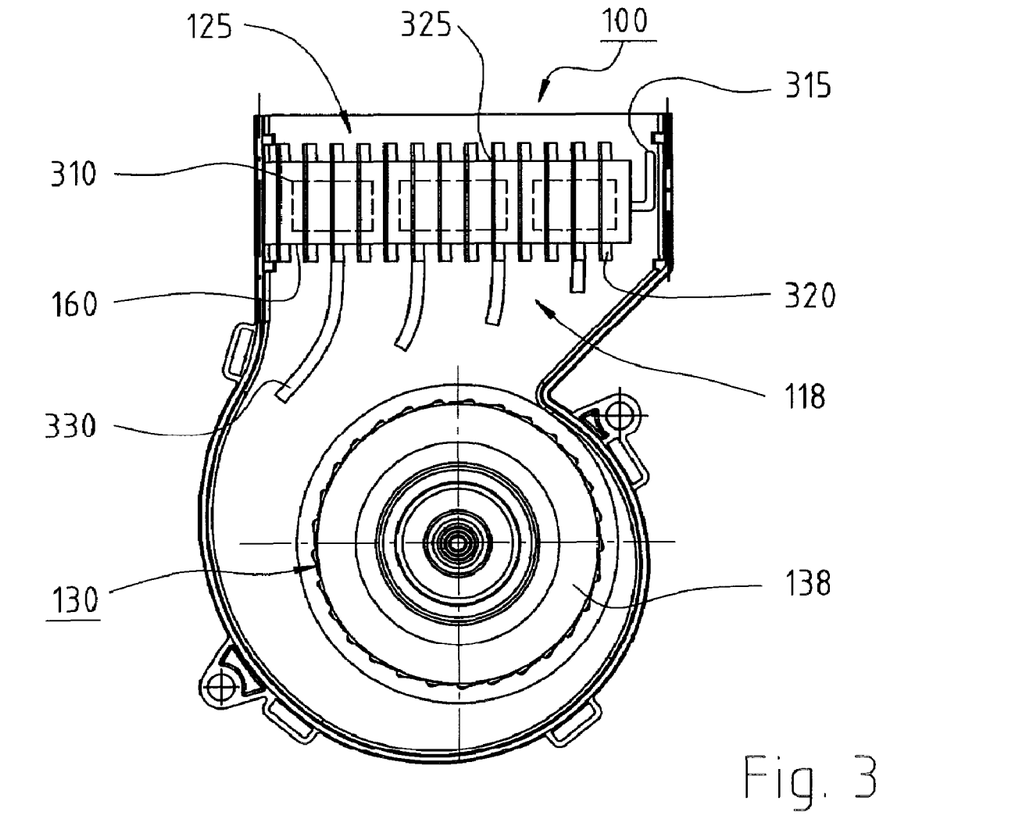
FIG. 3 is a sectioned view of a heating unit according to the present invention having a second embodiment of a heating element according to the invention.

FIG. 3 shows, in a further longitudinal section, heating unit 100 of FIG. 1 having an alternative configuration of electrical heating element 125. As shown in FIG. 3, electrical resistance heating element 160 of heating element 125 of FIG. 3 comprises pellet-shaped PTC heating elements 310 and can be connected via a lead 315 to a voltage source (not shown). Connecting lead 315 can be equipped with a plug connector.

Heating element 160 has air passage openings 325, into each of which extends a heat-dissipation element 320 that is connected in thermally conductive fashion to heating element 160.

Fan wheel 138 of radial fan 130 rotates clockwise during operation, as described above, in order to generate an air flow toward air outlet 118. This air flow is directed through electrical heating element 125 and thereby heated by heat-dissipation elements 320. In order to improve the heat transfer of heat-dissipation elements 320, the latter can be implemented with vane-shaped extensions 330. These extensions 330 can be configured as a function of the different flow velocities of the air flow, which are described below with reference to FIG. 5. For example, the higher the flow velocity at a corresponding location of air outlet 118, the longer extensions 330 can be, in order to thereby achieve improved heat dissipation.

Figure 4:
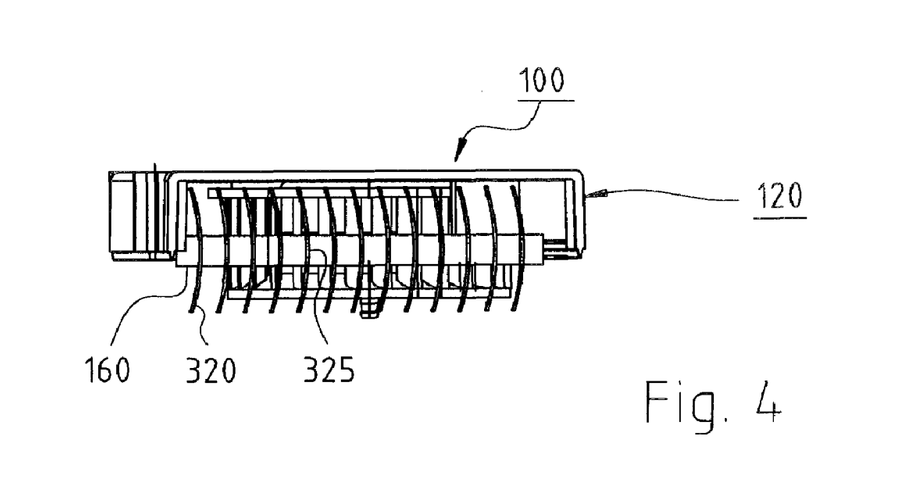
FIG. 4 is a plan view of one side of the heating unit of FIG. 3, to illustrate the second embodiment of the heating element.

FIG. 4 is a plan view of the side of heating unit 100 shown at the top in FIG. 3, with heating element 160 arranged in connecting part 120. Particularly visible in FIG. 4 are air passage openings 325 into which extend heat-dissipation elements 320 that are depicted, by way of example, as being arc-shaped.

As described above, one or more PTC heating elements are preferably used in heating unit 100 shown in FIGS. 1 to 4. PTC heating elements of this kind have a so-called self-regulating effect which, in a corresponding heating element, allows a maximum possible heat output to be achieved only if, during operation, all regions of the heating element exhibit a substantially identical heat transfer. For that, the air flow generated by the associated radial fan must exhibit a substantially homogeneous or linear flow profile so that the air velocities of the air flow are approximately the same at all regions of the PTC resistor, so that a uniform load on all regions is achieved and homogeneous heat transfer occurs. The flow profiles in heating unit 100 described with reference to FIGS. 1 to 4, however, exhibit an inhomogeneous flow profile with differing air velocities, as will be described in the context of FIG. 5.

A first improvement in heat output is possible by using different heating elements, or mixed forms having different heating elements, in the heating unit of FIGS. 1 to 4. For example, a given heating element can be implemented in honeycomb-shaped fashion in an air-flow region having higher air velocities, and in pellet-shaped fashion in the air-flow region having lower air velocities.

A further preferred improvement in heat output can be achieved by influencing the flow profile. To maximize the heat output in heating unit 100, a homogenization or increased velocity uniformity of the flow profile must accordingly be accomplished, as described in connection with FIG. 5, contrasting with those of FIGS. 6 to 11.

Figure 5:
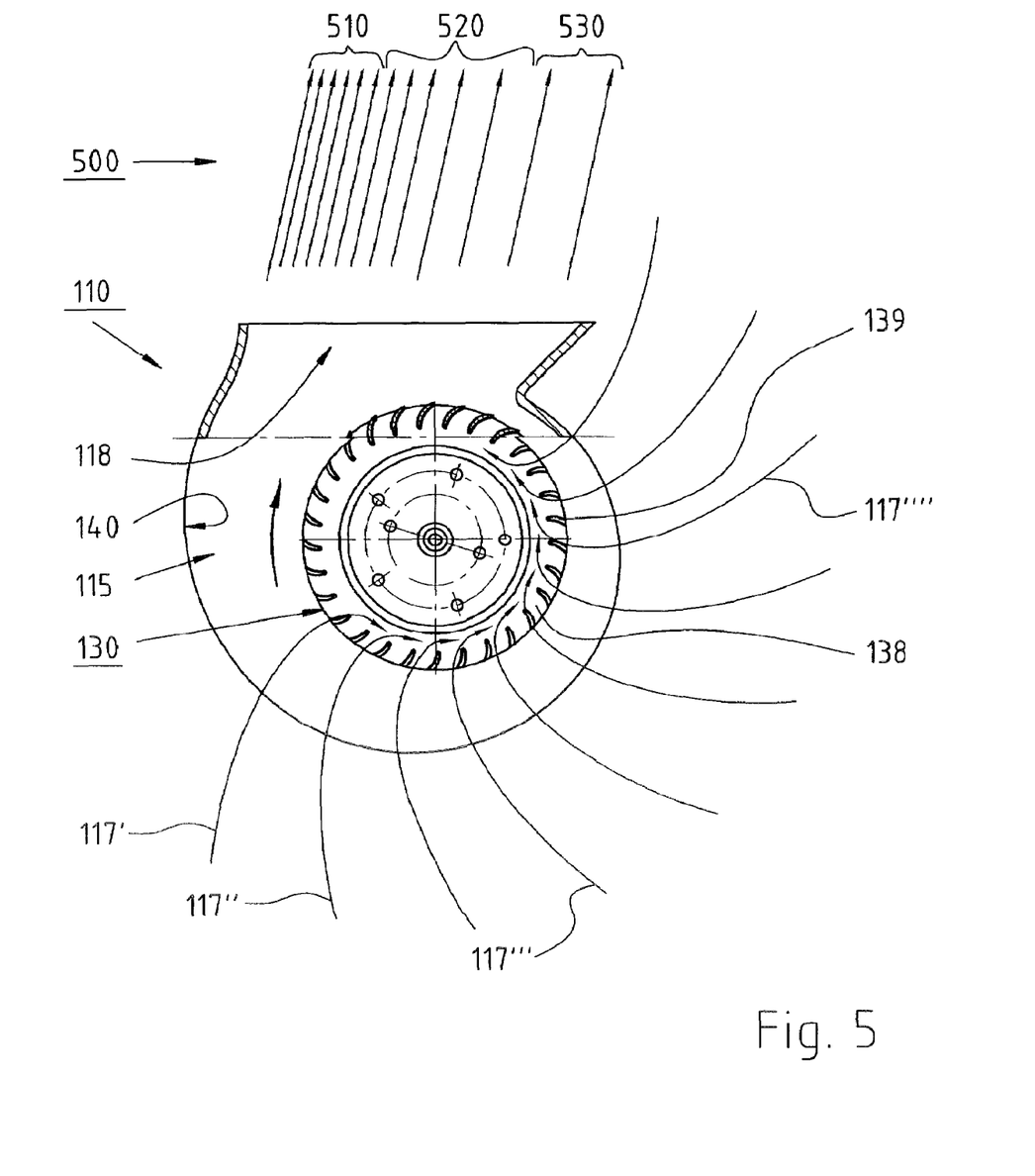
FIG. 5 is a sectioned view of the fan housing with the pressure chamber and radial fan, to illustrate the occurrence of different air velocities.

FIG. 5 is a simplified longitudinal section through fan housing 110 with radial fan 130 according to FIGS. 1 to 4. Clearly visible in FIG. 5 are fan blades 139 of fan wheel 138, which compress the ambient air (indicated by arrows 117', 117'', 117''', 117'''') that is drawn into pressure chamber 115, and transport it to air outlet 118. An air flow 500 is thus produced at air outlet 118.

That air flow has different air velocities at various regions 510, 520, 530 of air outlet 118. These different air velocities are dependent, on the one hand, on the configuration or conformation of the spiral-shaped pressure chamber 115 and, on the other hand, on the configuration of air-directing device 140. In a laboratory experiment with a 90-mm fan wheel, for example, air velocities of approximately 10 meters/second (m/s) were measured in region 510, 9 m/s measured in region 520, and 4 m/s measured in region 530.

In order to make the different velocities of air flow 500 substantially uniform, air flow 500 is delivered to electrical heating element 125 (not shown) via air-directing elements, as described below with reference to FIGS. 6 to 11.

Figure 6:
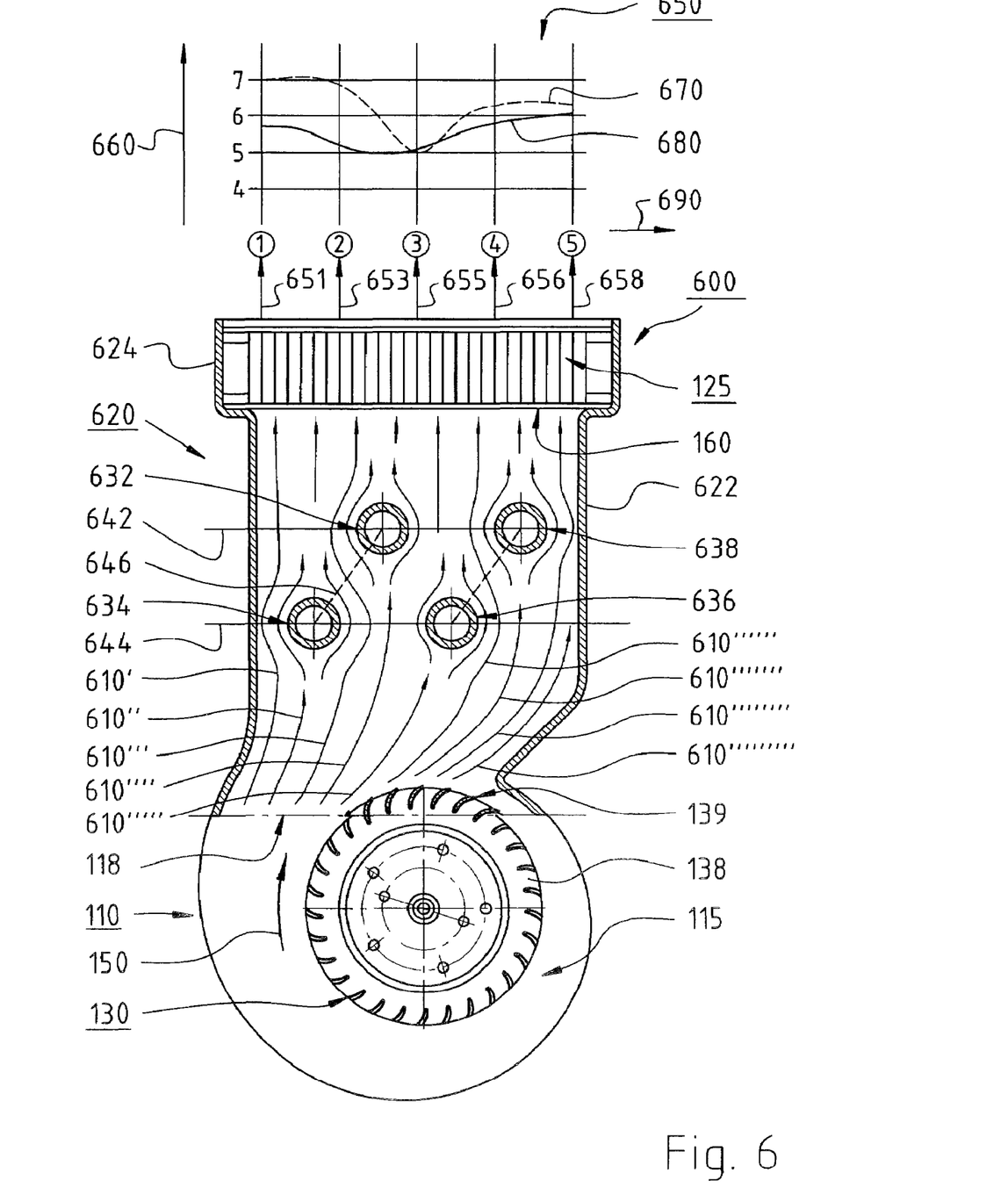
FIG. 6 is a sectioned view of a heating unit according to the present invention having a first arrangement of air-directing elements according to the invention, with an accompanying velocity distribution graph.

FIG. 6 is a longitudinal section through a heating unit 600 according to a first preferred embodiment of the invention. As is evident from FIG. 6, heating unit 600 comprises fan housing 110 with radial fan 130 of FIGS. 1 to 3; the latter are not described here again in detail.

In contrast to FIGS. 1 and 3, fan housing 110 of heating unit 600 in FIG. 6 is connected to a connecting part 620 that comprises a first portion 622 for receiving air-directing elements 632, 634, 636, 638, and a second portion 624 for receiving electrical heating element 125. Electrical heating element 125 can be constructed and can be mounted in second portion 624 as described above with reference to FIGS. 1 to 4, so that a description thereof will not be repeated.

Air-directing elements 632, 634, 636, 638 serve to generate a predetermined flow profile in an air flow generated by radial fan 130, and in accordance with a first preferred embodiment are columnar. Air-directing elements implemented in both tubular and rod-shaped fashion can be used in this context. The number of air-directing elements in FIG. 6 is even, and the arrangement of the air-directing elements is symmetrical.

In the exemplifying embodiment depicted, as is evident from FIG. 6, four columnar air-directing elements 632, 634, 636, 638 are oriented with respect to one another so that they constitute the corners of a parallelogram 646, air-directing elements 634, 636 being arranged on a first straight line 644 that is oriented substantially parallel to the longitudinal axis of heating element 125. Air-directing elements 632, 638 are arranged on a second straight line 642 that extends parallel to first straight line 644 and between that first straight line 644 and heating element 125.

During operation, fan wheel 138 of radial fan 130 rotates clockwise as indicated by arrow 150 in order to generate, with fan blades 139, an air flow in pressure chamber 115, as described in detail above with reference to FIG. 1. This air flow is illustrated symbolically by flow lines 610', 610'', 610''', 610'''', 610''''', 610'''''', 610''''''', 610'''''''', 610''''''''', and is referred to hereinafter as air flow 610.

Air flow 610 has different air velocities at air outlet 118 of fan housing 110, as will be explained with reference to a flow graph or profile 650. As a result of an eddying of at least part of air flow 610 around the columnar air-directing elements 632, 634, 636, 638, the differing air velocities of air flow 610 are equalized before air flow 610 flows through heating element 125 and is heated thereby.

For simplification, the heated air flow 610 flowing out of heating unit 600 is divided in FIG. 6 into five regions 1 to 5 that are indicated by arrows 651, 653, 655, 656, 658. These regions 651, 653, 655, 656, 658 are plotted or graphed on a horizontal axis 690 of flow profile 650, on whose vertical axis 660 the air velocities (in m/s) of the heated air flow 610 are plotted.

In flow profile 650, a first curve 670 shows the air velocities measured in regions 651, 653, 655, 656, 658 in a laboratory experiment using a 90-mm fan wheel for heating unit 600, without the use of air-directing elements 632, 634, 636, 638, velocities from 5 m/s to more than 7 m/s being depicted. This means that without the air-directing elements of the present invention, deviations of up to 2 m/s from the minimum velocity of 5 m/s occur. A second curve 680 shows the air velocities measured in a laboratory experiment in which air-directing elements 632, 634, 636, 638 were used, these velocities being between 5 m/s and approximately 6 m/s. With the use of air-directing elements, the deviations from the minimum velocity can therefore be decreased to a maximum of 1 m/s. Accordingly, the use of symmetrically arranged air-directing elements 632, 634, 636, 638 already, in accordance with the present invention, produces a definite linearization of the flow profile of air flow 610.

Figure 7:
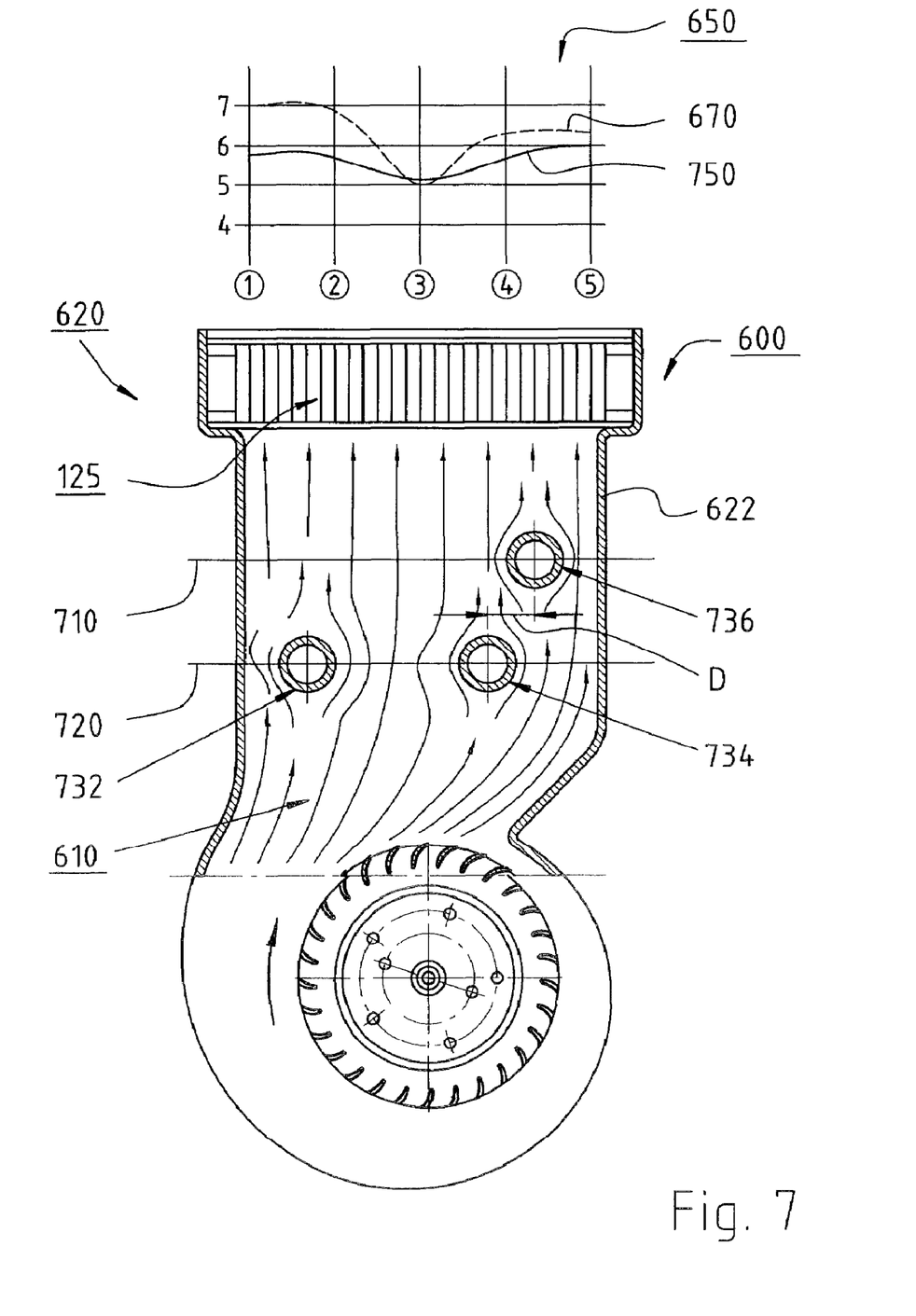
FIG. 7 is a sectioned view of a heating unit according to the present invention having a second arrangement of air-directing elements according to the invention, also with a graph.

FIG. 7 shows, in a further longitudinal section, heating unit 600 of FIG. 6 according to a second preferred embodiment. In contrast to FIG. 6, first portion 622 of connecting part 620 in FIG. 7 comprises an odd number of columnar air-directing elements, which form an asymmetrical arrangement.

In the exemplifying embodiment depicted in FIG. 7, first portion 622 comprises three columnar air-directing elements 732, 734, 736. Air-directing elements 732, 734 are arranged on a first straight line 720 that is oriented substantially parallel to the longitudinal axis of heating element 125. Air-directing element 736 is arranged on a second straight line 710 that extends parallel to first straight line 720 and between the latter and heating element 125. As FIG. 7 shows, air-directing element 736 is offset a distance D to the right with respect to air-directing element 734, or to the unit constituted by air-directing elements 732, 734.

In FIG. 7, flow profile 650 shows first curve 670 of FIG. 6 as well as a second curve 750 that shows the air velocities measured in a laboratory experiment with the use of air-directing elements 732, 734, 736 in the arrangement according to FIG. 7. These air velocities now cover a range of only approximately 5.3 to 6 m/s. The deviations from the minimum velocity can thus be decreased to a maximum of 0.7 m/s with the use of the arrangement according to FIG. 7. The use of the asymmetrically arranged air-directing elements 732, 734, 736 accordingly brings about a significant linearization of the flow profile of air flow 610, whose air velocities now form approximately a straight line 750 in flow profile 650.

Figure 8:
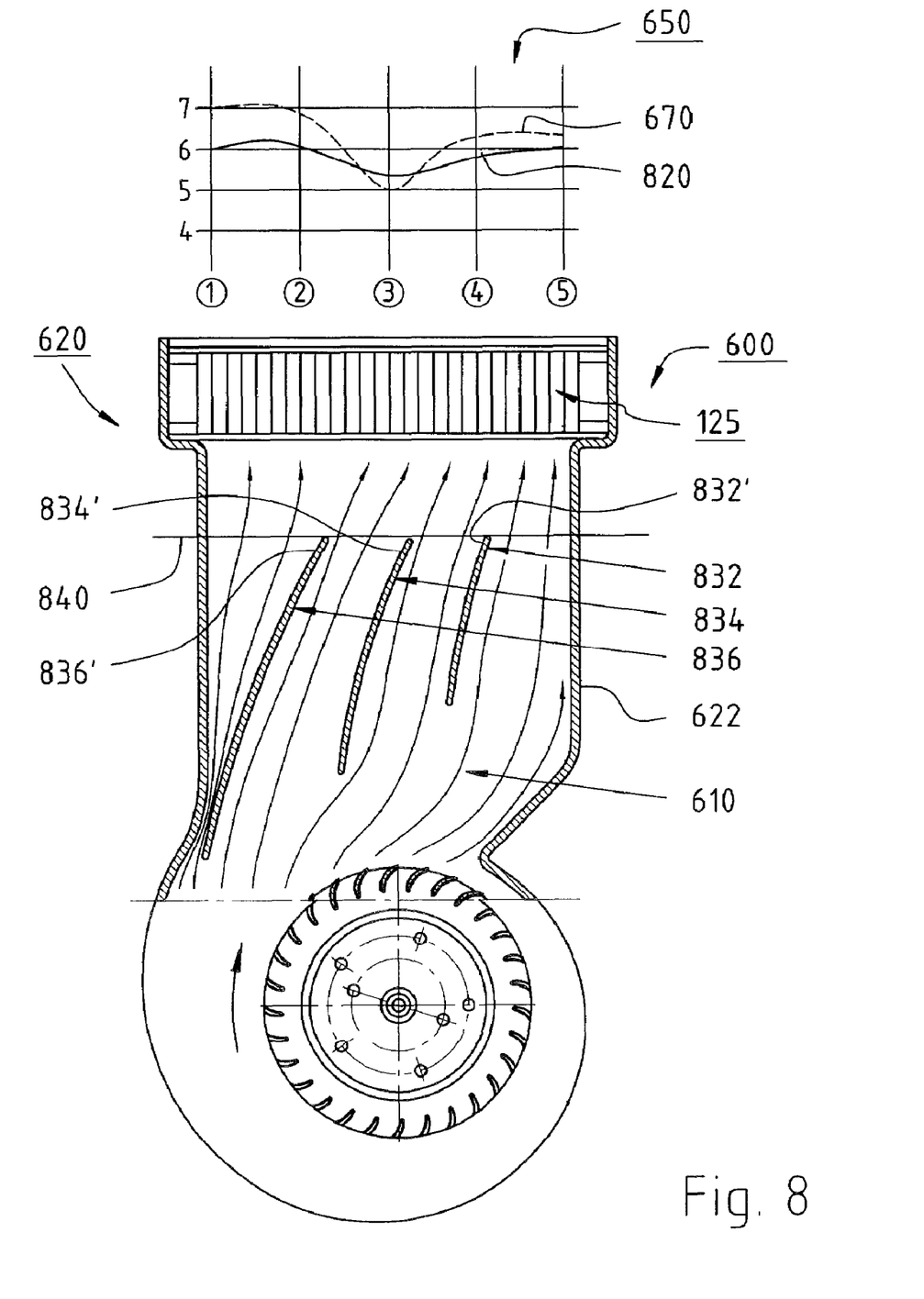
FIG. 8 is a sectioned view of a heating unit according to the present invention having a third arrangement of air-directing elements according to the invention, also with a graph.

FIG. 8 shows, in a longitudinal section, heating unit 600 of FIG. 6 according to a third preferred embodiment. In contrast to FIG. 6, first portion 622 of connecting part 620 in FIG. 8 comprises a predetermined number of scoop-shaped air-directing elements that are approximately arc-shaped, i.e. curved along one axis.

In the embodiment of FIG. 8, first portion 622 comprises three planar or scoop-shaped air-directing elements 832, 834, 836, air-directing element 832 having an upper end 832', air-directing element 834 having an upper end 834', and air-directing element 836 having an upper end 836'. Upper ends 832', 834', 836' of air-directing elements 832, 834, 836 are preferably arranged on a straight line 840 parallel to the longitudinal axis of electrical heating element 125. Air-directing elements 832, 834, 836 of FIG. 8 have different lengths that are determined as a function of the respective velocities of air flow 610.

The air velocities measured in a laboratory experiment with the use of air-directing elements 832, 834, 836 in the arrangement according to FIG. 8 are shown on a curve 820 in flow profile 650, which once again, for comparison, contains curve 670 of FIG. 6. The air velocities according to curve 820 cover a range from approximately 5.4 m/s to 6.2 m/s. The deviations from the minimum velocity can thus be decreased to a maximum of 0.8 m/s with the use of the arrangement according to FIG. 8. The use of air-directing elements 832, 834, 836 of FIG. 8 accordingly also brings about a definite linearization of the flow profile of air flow 610.

Figure 9:
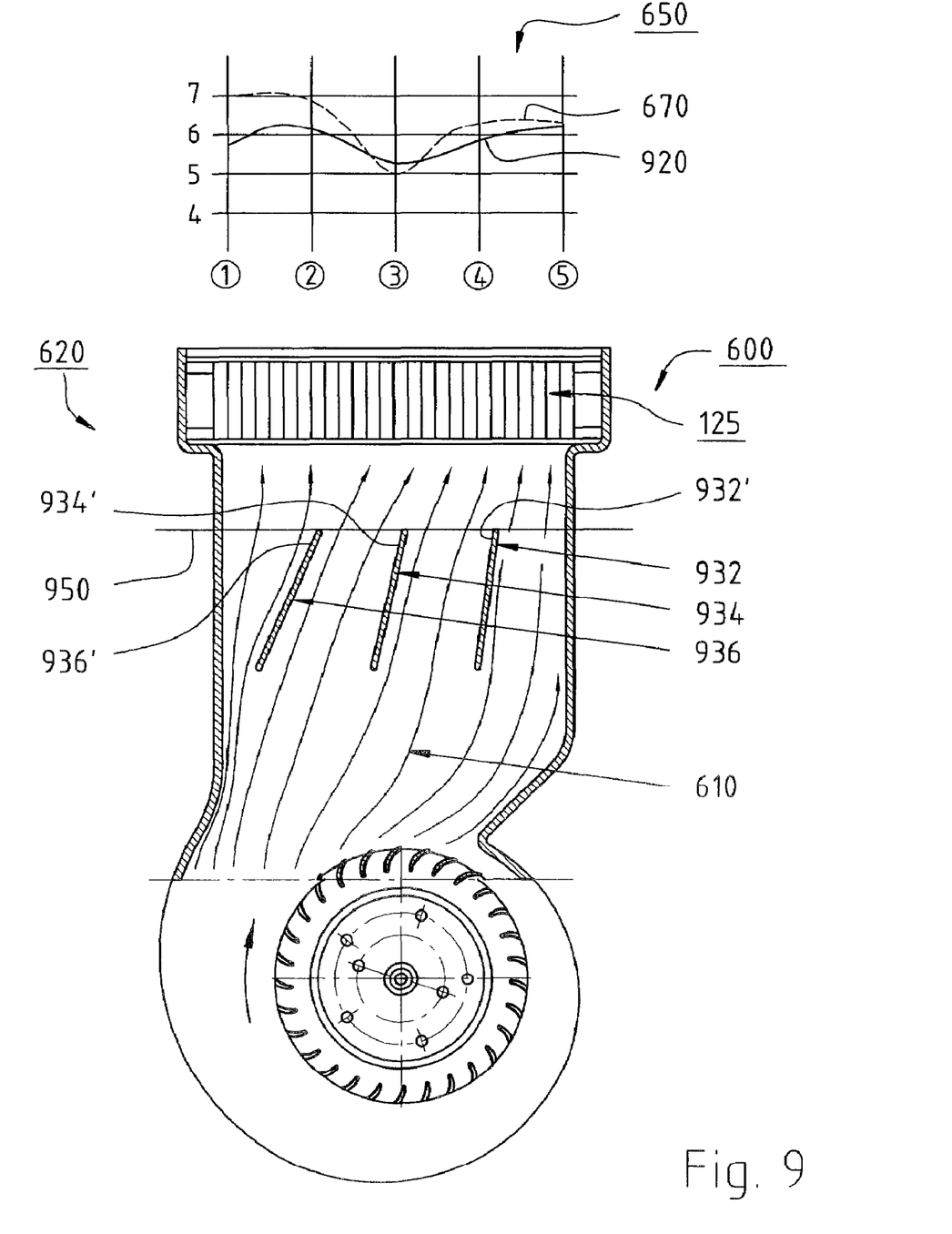
FIG. 9 is a sectioned view of a heating unit according to the present invention having a fourth arrangement of air-directing elements according to the invention, also with a graph.

FIG. 9 shows, in a longitudinal section, heating unit 600 of FIG. 6 according to a fourth preferred embodiment. In contrast to FIG. 6, first portion 622 of connecting part 620 in FIG. 9 comprises a predetermined number of planar or scoop-shaped air-directing elements that are configured in approximately straight fashion.

In the embodiment of FIG. 9, first portion 622 comprises three air-directing elements 932, 934, 936 of approximately the same length, which comprise respective upper ends 932', 934', 936'. Upper ends 932', 934', 936' are preferably arranged on a straight line 950 parallel to the longitudinal axis of electrical heating element 125. As is evident from FIGS. 8 and 9, air-directing elements 932, 934, 936 of FIG. 9 are preferably shorter than air-directing elements 832, 834, 836 of FIG. 8.

The air velocities measured in a laboratory experiment with the use of air-directing elements 932, 934, 936 in the arrangement according to FIG. 9 are shown on a curve 920 in flow profile 650, which once again, for comparison, shows curve 670 of FIG. 6. The air velocities according to curve 920 cover a range from approximately 5.4 m/s to 6.3 m/s. The deviations from the minimum velocity can thus be decreased to a maximum of 0.9 m/s with the use of the arrangement according to FIG. 9. The use of air-directing elements 932, 934, 936 of FIG. 9 accordingly also brings about a definite linearization of the flow profile of air flow 610.

Figure 10:
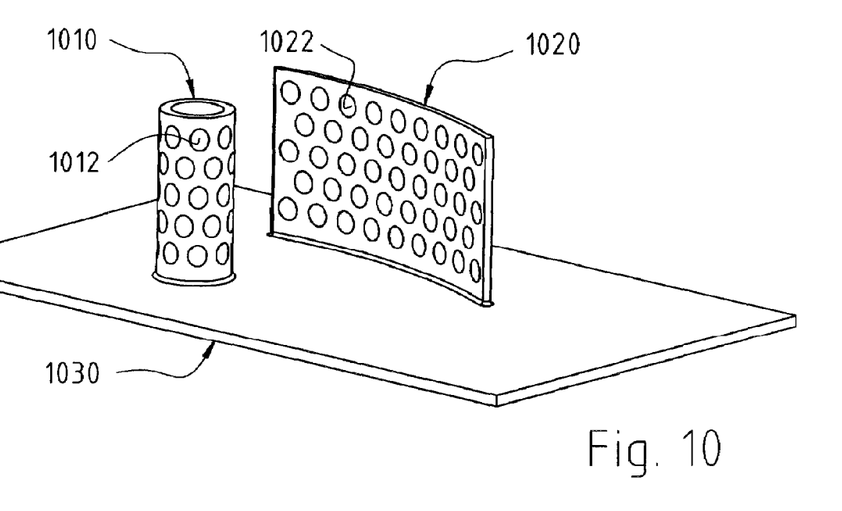
FIG. 10 is a perspective view of air-directing elements according to a preferred embodiment of the invention.

FIG. 10 shows a preferred embodiment of air-directing elements according to the present invention. FIG. 10 accordingly shows, on the one hand, a tubular air-directing column 1010 and, on the other hand, an arc-shaped air-directing scoop or airfoil 1020, which are arranged by way of example on a carrier plate 1030 (e.g. an inner wall of a connecting part according to the present invention).

Tubular air-directing column 1010 has a plurality of recesses 1012, and arc-shaped air-directing scoop 1020 has a plurality of recesses 1022. Recesses 1012, 1022 serve to reduce the surface resistance of air-directing elements 1010, 1020, in order to improve flow characteristics thereof in a corresponding connecting part (e.g. connecting part 120 of FIGS. 1 to 4 or connecting part 620 of FIGS. 6 to 9).

Figure 11:
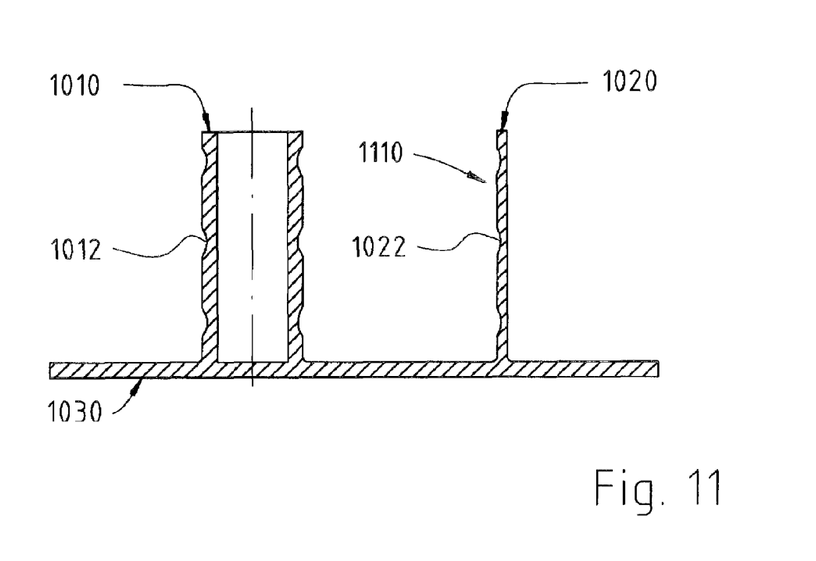
FIG. 11 is a sectioned view of the air-directing elements of FIG. 10.
Figure 12:
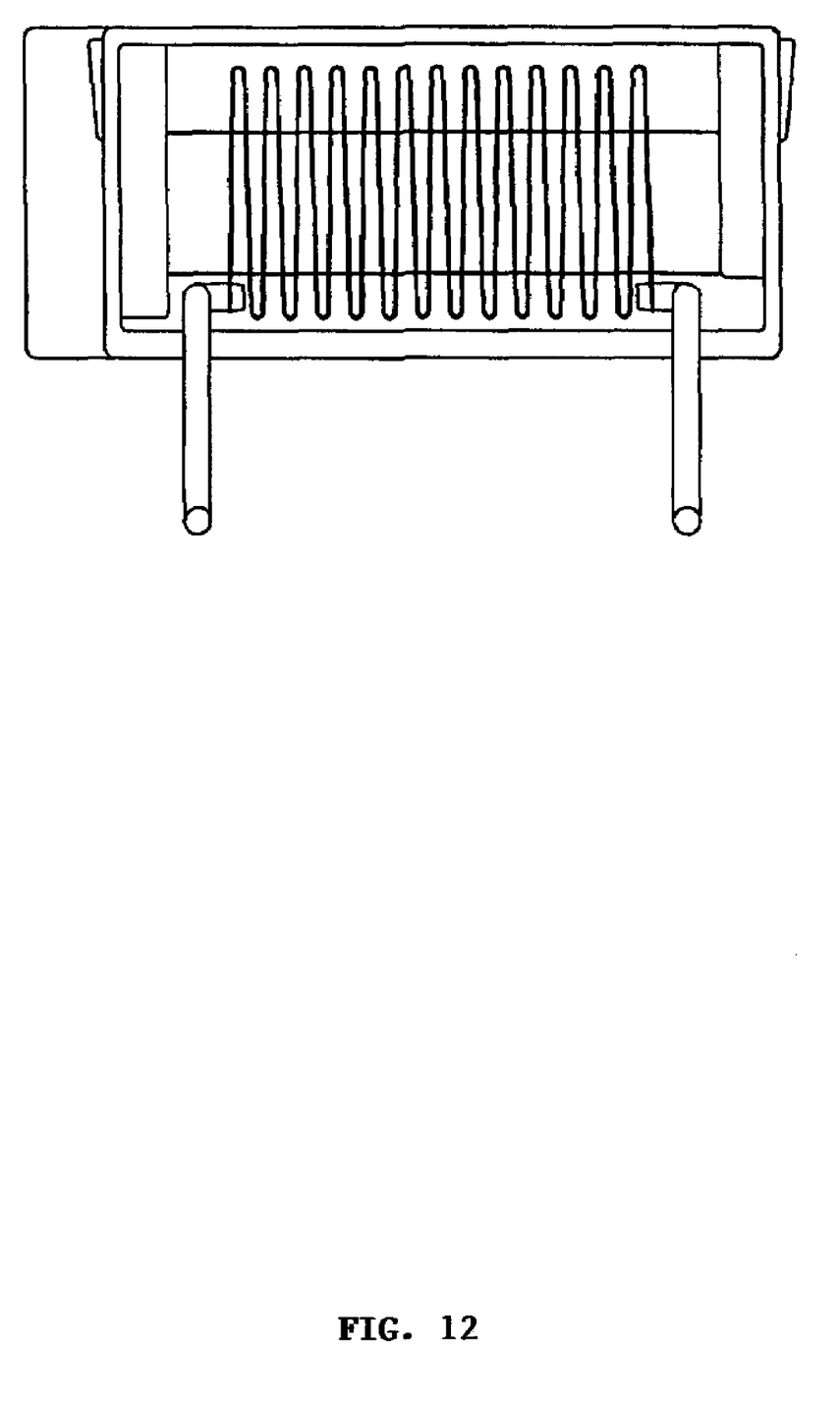
FIG. 12 schematically shows a heater wire.

FIG. 11 is a sectioned view of air-directing elements 1010, 1020 of FIG. 10, arranged on carrier plate 1030.

FIG. 11 illustrates the preferred embodiment of recesses 1012, 1022 on air-directing elements 1010, 1020. FIG. 11 also shows that only left side 1110 of air-directing element 1020 is formed with recesses 1022. This side 1110 corresponds in FIG. 8 to the respective right side of air-directing elements 832, 834, 836, and is the side on which a corresponding air flow (e.g. air flow 610 of FIG. 8) at least in part impinges and is diverted. A decrease in surface resistance at this side 1110 is therefore desirable. The air flow does not impinge for deflection on the opposite side of air-directing element 1020, so that the surface resistance there plays only a subordinate role.

Numerous variants and modifications are of course possible within the scope of the present invention.

What is claimed is:

1. A heating unit adapted for use in a vehicle, which heating unit comprises:
    a radial fan (100) having a fan housing (110), said housing defining a pressure chamber with an air inlet (116) and an air exit opening (118);
    an air-directing device (140) that guides an air flow, within the pressure chamber (115) of the fan housing (110), to the air exit opening (118), said air-directing device including an external, approximately spiral-shaped wall (109) forming part of a spiral housing (140) and extending as far as an air exit opening (118), the air (137) delivered by the radial fan wheel (130) during operation having, at the air exit opening (118) and near the spiral-shaped wall (109) in a zone (510) of higher velocity, a higher velocity than in zones (520, 530) of lower velocity that are located farther away from the spiral-shaped wall (109);
    a radial fan wheel (130) arranged in the fan housing (110), for generating an air flow from the air inlet (116) via the pressure chamber (115) to the air exit opening (118);
    an electrical heating element (125) arranged adjacent the air exit opening (118) and serving to transfer heat to the air flow generated by the radial fan (100); and
    wherein there is provided, between the air exit opening (118) of the spiral housing (140) and the heating element (125), a connecting part (620) in which air-directing elements are provided for generating a predetermined flow profile of the air flow (610), which air-directing elements are configured to deflect air that emerges from the spiral housing (140) in a zone (510) thereof having a relatively higher air velocity, in order to achieve a more uniform velocity distribution in the region of the heating element (125).

2. The heating unit according to claim 1, wherein the electrical heating element (125; 160) comprises, at least in part, a heating wire.

3. The heating unit according to claim 1, wherein
the electrical heating element (160) comprises at least one PTC (Positive Temperature Coefficient) resistor (310).

4. The heating unit according to claim 1, wherein
the electrical heating element (125, 160) defines at least one air passage opening (325) into which extends a heat dissipation element (120) that is connected in thermally conductive fashion to the heating element (160).

5. The heating unit according to claim 1, wherein
the electrical heating element (125) is honeycomb-shaped.

6. The heating unit according to claim 5, wherein the honeycomb-shaped heating element (125) comprises air chambers (210) through which flow, during operation, an air flow generated by the radial fan (130).

7. The heating unit according to claim 6, wherein the air chambers (210) have, at least in part, a profile that corresponds approximately to the direction of the air flow near the heating element (125).

8. The heating unit according to claim 1, wherein
the radial fan (130) is implemented as a miniature fan.

9. The heating unit according to claim 1, wherein
at least some of the air-directing elements (1010, 1020) comprise a surface, at least part of which is formed with recesses (1012, 1022) in order to reduce thereon the surface resistance of the air-directing elements (1010, 1020).

10. The heating unit according to claim 1, wherein
at least some of the air-directing elements (632, 634, 636, 638, 732, 734, 736) are approximately columnar.

11. The heating unit according to claim 10, wherein
at least two columnar air-directing elements (634, 636; 632, 638) are arranged on an imaginary straight line (642; 644) that extends substantially parallel to the air exit opening (118) of the spiral housing (140).

12. The heating unit according to claim 11, wherein two columnar air-directing elements (634, 636; 732, 734) are arranged on a first imaginary straight line (644; 720) that is located adjacent the air exit opening (118) of the spiral housing (140),
the totality of these air-directing elements being offset, away from an imaginary position symmetrical with respect to the air exit opening (118), toward the zone (510) of higher velocity.

13. The heating unit according to claim 12, wherein
at least one columnar air-directing element (632, 638; 736) is arranged on a second imaginary straight line (642; 710), which latter extends approximately parallel to the first straight line (644; 720) and has a greater spacing from the air exit opening (118) than the first straight line (644; 740),
and is arranged there in a region of the zones (520, 530) of lower velocity.

14. The heating unit according to claim 1, wherein
at least some of the air-directing elements (832, 834, 836, 932, 934, 936) are generally scoop-shaped.

15. The heating unit according to claim 14,
wherein at least some of the scoop-shaped air-directing elements (932, 934, 936) are of approximately a uniform length and are configured in substantially straight fashion.

16. The heating unit according to claim 14, wherein at least some of the scoop-shaped air-directing elements (832, 834, 836) are of different lengths and are arc-shaped.

17. The heating unit according to claim 14, wherein at least some of the scoop-shaped air-directing elements (832, 834, 836; 932, 934, 936) extend approximately as far as an imaginary straight line (840; 850) that extends substantially parallel to the air exit opening (118) of the spiral-shaped housing (140).

18. A heating unit adapted for use in a vehicle, which heating unit comprises:
a radial fan (100) having a fan housing (110), said housing defining a pressure chamber with an air inlet (116) and an air exit opening (118);
an air-directing device (140) that guides an air flow, within the pressure chamber (115) of the fan housing (110), to the air exit opening (118);
a radial fan wheel (130) arranged in the fan housing (110), for generating an air flow from the air inlet (116) via the pressure chamber (115) to the air exit opening (118); and
an electrical heating element (125) arranged adjacent the air exit opening (118) and serving to transfer heat to the air flow generated by the radial fan (100),
wherein there is provided, between the air exit opening (118) of the spiral housing (140) and the heating element (125), a connecting part (620) in which four approximately columnar air-directing elements (632, 634, 636, 638) are arranged at the corners of an imaginary parallelogram (646) in which two sides extend approximately parallel to the air exit opening (118) of the spiral housing (140).

19. A heating unit adapted for use in a vehicle, which heating unit comprises:
a radial fan (100) having a fan housing (110), said housing defining a pressure chamber with an air inlet (116) and an air exit opening (118);
an air-directing device (140) that guides an air flow, within the pressure chamber (115) of the fan housing (110), to the air exit opening (118);
a radial fan wheel (130) arranged in the fan housing (110), for generating an air flow from the air inlet (116) via the pressure chamber (115) to the air exit opening (118); and
an electrical heating element (125) arranged adjacent the air exit opening (118) and serving to transfer heat to the air flow generated by the radial fan (100),
wherein there is provided, between the air exit opening (118) of the spiral housing (140) and the heating element (125),
a connecting part (620) in which three air-directing elements (732, 734, 736) are provided, of which two air-directing elements (732, 734) are arranged on a first straight line (720) that extends approximately parallel to the air exit opening, and the third air-directing element (736) is arranged between the first straight line (720) and the electrical heating element (125).

* * * * *